(12) United States Patent
Bortoli et al.

(10) Patent No.: US 11,603,211 B2
(45) Date of Patent: Mar. 14, 2023

(54) RAM AIR TURBINE ROLLING ELEMENT BEARING SUPPORTED TURBINE RELEASE FOR LOAD REDUCTION

(71) Applicant: Hamilton Sundstrand Corporation, Charlotte, NC (US)

(72) Inventors: Stephen Michael Bortoli, Roscoe, IL (US); Stuart T. Gerger, Madison, WI (US); Timothy Scott Konicek, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 360 days.

(21) Appl. No.: 16/821,859

(22) Filed: Mar. 17, 2020

(65) Prior Publication Data

US 2021/0291999 A1 Sep. 23, 2021

(51) Int. Cl.
*B64D 41/00* (2006.01)
*F03D 9/32* (2016.01)
*F03D 9/25* (2016.01)
*F03D 80/70* (2016.01)

(52) U.S. Cl.
CPC ............. *B64D 41/007* (2013.01); *F03D 9/32* (2016.05); *F03D 9/25* (2016.05); *F03D 80/70* (2016.05); *F05B 2220/50* (2013.01); *F05D 2220/34* (2013.01)

(58) Field of Classification Search
CPC ......... B64D 41/007; F03D 9/32; F03D 80/70; F05B 2220/50; F05D 2220/34; F05D 2260/50; F05D 2260/56; F01D 25/28
See application file for complete search history.

(56) References Cited

U.S. PATENT DOCUMENTS

| | | | |
|---|---|---|---|
| 3,003,748 A | 10/1961 | Musser | |
| 4,717,095 A * | 1/1988 | Cohen | B64D 41/007 244/58 |
| 4,742,976 A * | 5/1988 | Cohen | F03D 9/25 244/58 |
| 4,945,979 A | 8/1990 | Cullen et al. | |
| 6,676,379 B2 * | 1/2004 | Eccles | F03D 15/10 416/142 |
| 7,074,010 B2 | 7/2006 | DeGroff et al. | |
| 7,296,970 B2 | 11/2007 | Bannon et al. | |
| 10,352,350 B2 | 7/2019 | Rake et al. | |
| 2012/0114485 A1 | 5/2012 | Russ | |
| 2013/0287569 A1 | 10/2013 | Bannon et al. | |
| 2014/0070049 A1 | 3/2014 | Russ et al. | |

OTHER PUBLICATIONS

Extended European search report issued in correspnding EP application No. 21163260.9, dated Aug. 9, 2021.

* cited by examiner

*Primary Examiner* — Michael Lebentritt
*Assistant Examiner* — Danielle M. Christensen
(74) *Attorney, Agent, or Firm* — Locke Lord LLP; Daniel J. Fiorello; Gabrielle Gelozin

(57) ABSTRACT

A ram air turbine release system including a turbine defining a rotational axis including at least one notch therein for receiving a plunger to prevent rotation of the turbine mechanically by moving between a first position and a second position, and a first bearing system contacting at least a portion of an outer surface of the plunger configured to reduce friction produced when the plunger moves between the first positon and the second position.

15 Claims, 3 Drawing Sheets

RAM AIR TURBINE ROLLING ELEMENT BEARING SUPPORTED TURBINE RELEASE FOR LOAD REDUCTION

BACKGROUND

Technological Field

The present disclosure relates to a ram air turbine deployment, and more particularly to mechanism for decreasing stress on the ram air turbine cable.

Description of Related Art

A variety of devices are used for deploying a ram air turbine (RAT). Current RATs are stopped from rotating while stowed using a plunger that is grounded to a RAT stationary structure or support and interfaces with the turbine driveshaft that is otherwise free to rotate. Once the RAT is deployed, this turbine produces a large amount torque on a turbine release plunger. The force can lead to high forces on the turbine release cable which can in-turn lead to cable stretch. This cable stretch can lead to failure to release at a later time. Conventional methods have led to bulkier drive shafts and cables and increased weight because components are sized for these increased loads.

The conventional methods and systems have generally been considered satisfactory for their intended purpose. However, there is still a need in the art for a RAT release mechanism and method having improved control and a lower stress loads. There also remains a need in the art for such methods and components that are economically viable. The present disclosure may provide a solution for at least one of these remaining challenges.

SUMMARY OF THE INVENTION

A ram air turbine release system includes a turbine defining a rotational axis including at least one notch therein configured to receive a plunger, a plunger configured to prevent rotation of the turbine and to move between a first position and a second position, and a first bearing contacting at least a portion of an outer surface of the plunger configured to reduce friction produced when the plunder moves between the first positon and the second position. A surface of the notch can be angled with respect to the rotational axis.

The plunger can be partially housed within a bore coupled to a turbine support member. The first bearing can be located within the bore between an inner surface of the bore and an outer surface of the plunger. The first bearing can be a linear bearing elongated along an axis parallel to a primary axis of the plunger. A coefficient of friction between the plunger and a portion of bearing system can be below 0.03.

A second bearing can be located at least partially within the notch of the turbine. The second bearing is a non-linear bearing. The at least one notch can include a plurality of notches, evenly distributed around the turbine.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
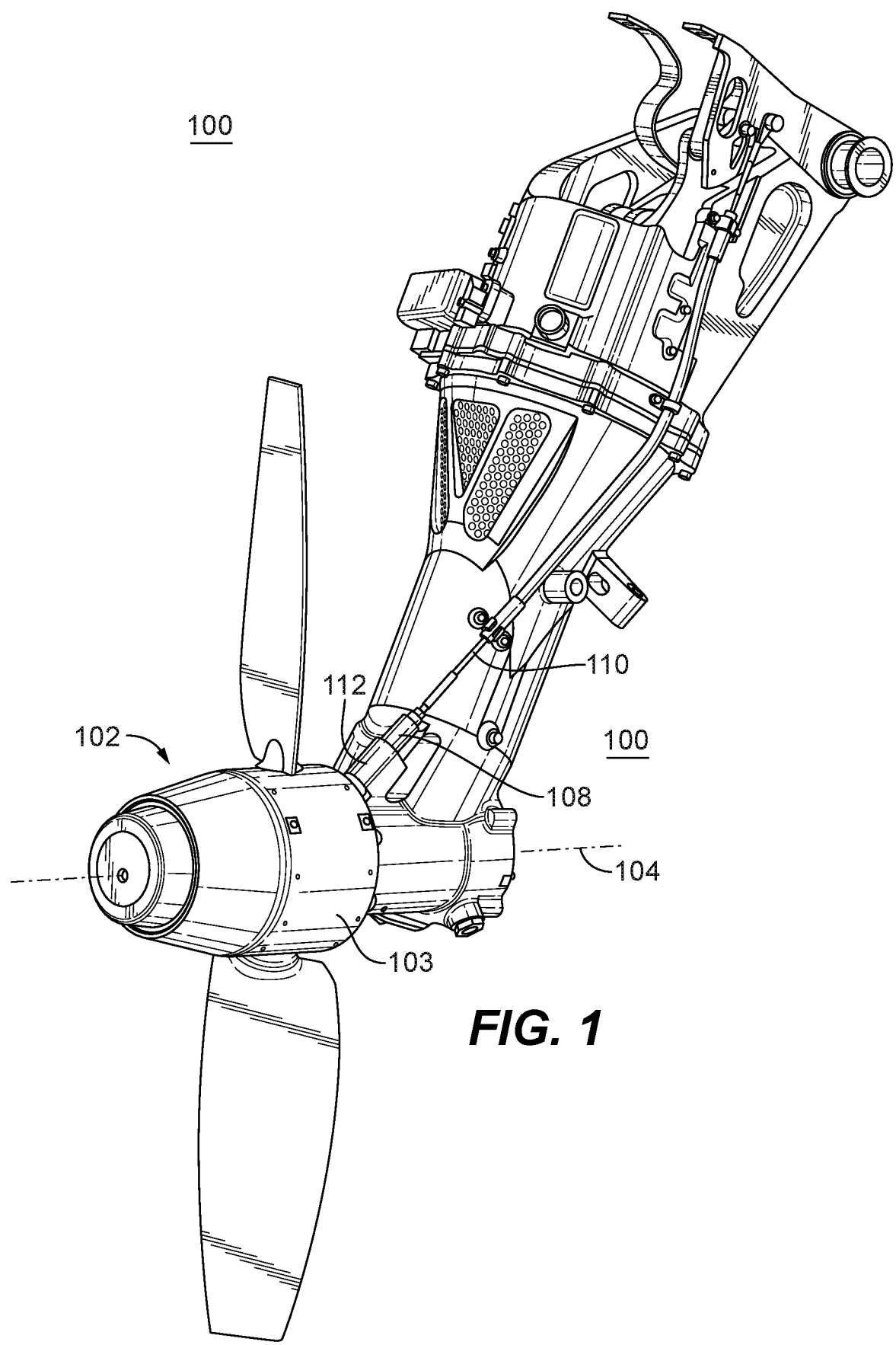
FIG. 1 is a perspective view of a RAT in deployed state.

Reference will now be made to the drawings wherein like reference numerals identify similar structural features or aspects of the subject invention. For purposes of explanation and illustration, and not limitation, a partial view of an exemplary embodiment of a RAT deployment system in accordance with the invention is shown in FIG. 1 and is designated generally by reference character 100. Other embodiments of the system in accordance with the invention, or aspects thereof, are provided in FIGS. 2-3, as will be described. The methods and systems of the invention can be used to ease retraction of a rat plunger and decrease stress loads on a RAT.

FIG. 1 shows a ram air turbine deployment system 100 including a turbine 102 which rotates about and defines a rotational axis 104. A RAT 100 is deployed in order to produce auxiliary power to an aircraft during flight. Although the deployment is typically done during situations requiring a quick response, it is necessary to wait until the RAT has been fully deployed before the turbine starts spinning in order to avoid striking various components within the hull of an aircraft. The turbine 102 includes at least one notch 106 (shown in FIGS. 2 and 3) located on the inside of the turbine housing 103 therein which receives a plunger 108 which prevents rotation of the turbine 102 when inserted into the notch 106. The notch 106 is a cavity within a portion of the turbine 102 that rotates. After the RAT 100 is fully deployed, the plunger 108 is quickly removed allowing the turbine 102 to spin freely. The plunger moves between a first position 108a (inserted) and a second position 108b (pulled out) by being pulled by a turbine release cable 110.

Figure 2:
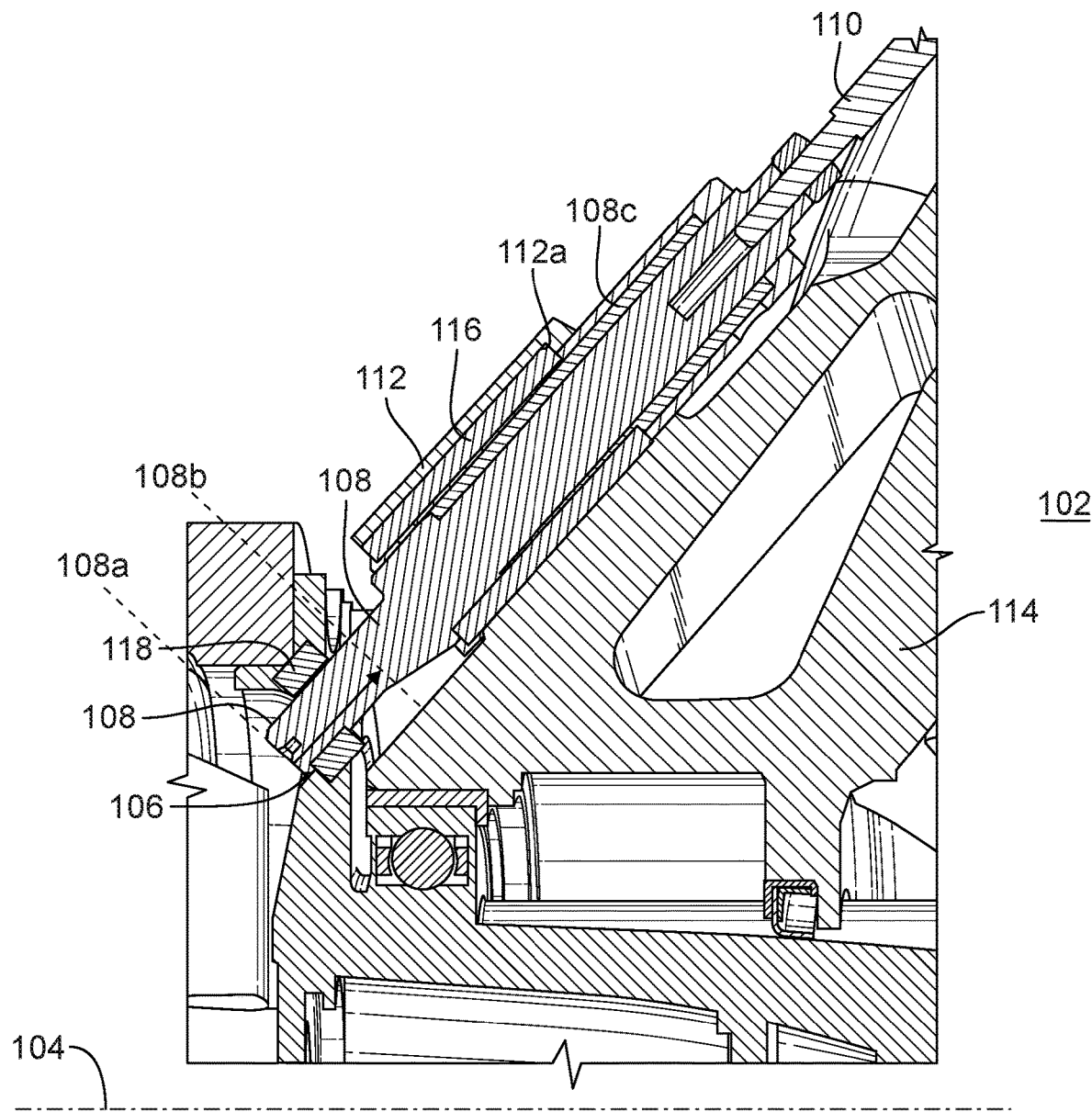
FIG. 2 is a side cross-section view of FIG. 1, showing a plunger and bearings.
Figure 3:
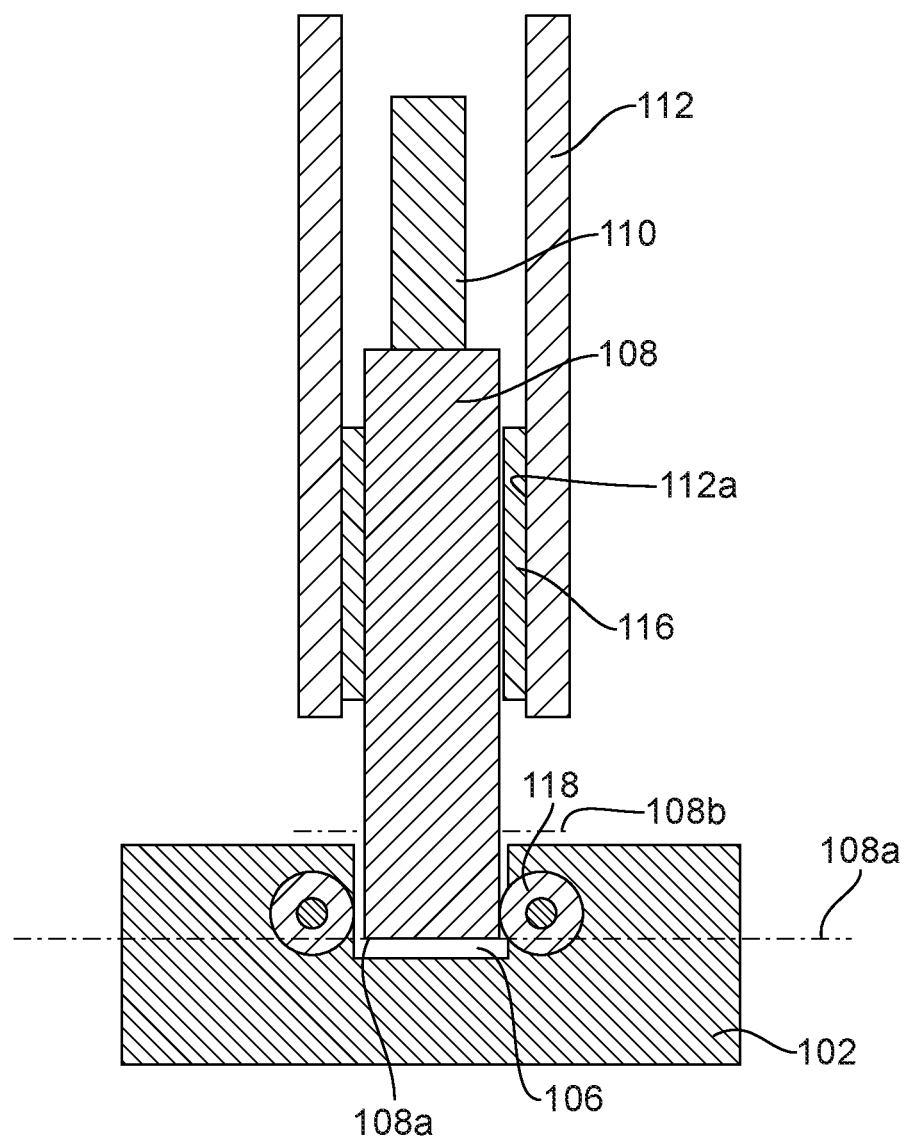
FIG. 3 is a front cross-section of FIG. 1, showing the plunger and bearings.

FIGS. 2 and 3 show the plunger 108 located partially within a bore 112 which protects the plunger 108. The bore 112 is attached to a turbine support member 114. In order to decrease the stresses on the cable 110 and on the plunger 108 a first bearing 116 contacts at least a portion of the plunger 108 to reduce friction when the plunger 108 moves between the first position 108a and the second position 108b. The bore 112 houses the first bearing 116 between an inner surface 112a the bore and an outer surface of the plunger 108c. The first bearing 116 can be a linear bearing elongated along an axis parallel to the movement axis of the plunger 108 from the first position 108a to the second position 108b. The coefficient of friction between the plunger 108 and the bearing is below 0.03, and preferably 0.02. The plunger 108 is inserted into notch 106 at an angle with the rotational axis 104 of the turbine 102. A second bearing 118 can be located within the notch 106. The second bearing 118 is a non-linear bearing. It is also considered that a plurality of notches 106 can be distributed around the turbine.

The methods and systems of the present disclosure, as described above and shown in the drawings, provide for a RAT deployment system with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A ram air turbine deployment system comprising:
   a turbine defining a rotational axis including at least one notch therein;
   a plunger disposed within the at least one notch configured to prevent rotation of the turbine mechanically configured to move between a first position and a second position; and
   a first bearing contacting at least a portion of an outer surface of the plunger configured to reduce friction produced when the plunger moves between the first positon and the second position, wherein the first bearing is partially housed within a bore coupled to the turbine.

2. The system of claim 1, wherein a surface of the notch is angled with respect to the rotational axis.

3. The system of claim 1, wherein the plunger is partially housed within the bore.

4. The system of claim 3, wherein the first bearing is located within the bore between an inner surface of the bore and the outer surface of the plunger.

5. The system of claim 4, wherein the first bearing is a linear bearing.

6. The system of claim 5, wherein the linear bearing is elongated along an axis parallel to a primary axis of the plunger.

7. The system of claim 1, wherein the bearing system includes a second bearing located at least partially within the notch of the turbine.

8. The system of claim 7, wherein the second bearing is a non-linear bearing.

9. The system of claim 1, wherein the plunger is attached to a turbine release cable.

10. The system of claim 1, wherein a coefficient of friction between the plunger and a portion of the bearing is below 0.03.

11. The system of claim 1, wherein the at least one notch includes a plurality of notches.

12. The system of claim 11, where the notches are evenly arranged circumferentially around the turbine.

13. The system of claim 1, further comprising a plurality of plungers.

14. The system of claim 1, wherein the plunger and the bearing are metallic.

15. The system of claim 1, wherein a primary axis of the plunger is angled at a non-zero angle with respect to the rotational axis of the turbine.

* * * * *